US010848615B2

United States Patent
Kim et al.

(10) Patent No.: US 10,848,615 B2
(45) Date of Patent: Nov. 24, 2020

(54) ELECTRONIC DEVICE AND METHOD FOR CALL BACK NOTIFICATION SERVICE

(71) Applicant: Samsung Electronics Co., Ltd., Suwon-si (KR)

(72) Inventors: Pilwon Kim, Seoul (KR); Wonjun Lee, Gwacheon-si (KR); Jungwon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/689,658

(22) Filed: Aug. 29, 2017

(65) Prior Publication Data

US 2018/0063322 A1     Mar. 1, 2018

(30) Foreign Application Priority Data

Aug. 30, 2016    (KR) .................. 10-2016-0111146

(51) Int. Cl.
    *H04M 3/42*     (2006.01)
    *H04M 1/64*     (2006.01)
    (Continued)

(52) U.S. Cl.
    CPC ......... *H04M 3/42195* (2013.01); *H04M 1/64* (2013.01); *H04M 1/72519* (2013.01); *H04M 1/72522* (2013.01); *H04M 1/72566* (2013.01); *H04M 1/72583* (2013.01); *H04M 3/42102* (2013.01); *H04W 4/16* (2013.01); *H04M 1/57* (2013.01); *H04M 1/72552* (2013.01); *H04M 3/436* (2013.01); *H04M 2203/2072* (2013.01);
    (Continued)

(58) Field of Classification Search
    CPC ............... H04M 3/42195; H04M 3/48; H04M 2203/2072; H04M 3/5231; H04W 4/16
    USPC ................................... 379/210.01; 455/414.1
    See application file for complete search history.

(56) References Cited

U.S. PATENT DOCUMENTS

| 7,233,229 | B2 | 6/2007 | Stroupe et al. |
| 8,000,461 | B2 | 8/2011 | Holder et al. |
| (Continued) | | | |

FOREIGN PATENT DOCUMENTS

| CN | 101232665 A | 7/2008 |
| CN | 102741813 A | 10/2012 |
| (Continued) | | |

OTHER PUBLICATIONS

Chinese Office Action dated Jul. 1, 2020, issued in Chinese Patent Application No. 201710768016.0.

*Primary Examiner* — Rasha S Al Aubaidi
(74) *Attorney, Agent, or Firm* — Jefferson IP Law, LLP (57) ABSTRACT

An electronic device is disclosed. The electronic device includes a communication interface such as a transceiver, a display, a processor electrically connected to the communication interface and the display, and a memory electrically connected to the processor, wherein the memory stores instructions for controlling, when executed, the processor to transmit a reception reject message to a caller device through the communication interface in response to an incoming call received from the caller device, to create a call back reminder linked to caller identification information of the caller device when the reception reject message contains context of a call back intention, and to output a notification of the created call back reminder.

21 Claims, 9 Drawing Sheets

(51) Int. Cl.
*H04M 1/725* (2006.01)
*H04W 4/16* (2009.01)
*H04M 1/57* (2006.01)
*H04M 3/436* (2006.01)

(52) U.S. Cl.
CPC ............... *H04M 2203/651* (2013.01); *H04Q 2213/13152* (2013.01)

(56) References Cited

U.S. PATENT DOCUMENTS

| | | | |
|---|---|---|---|
| 8,190,213 B2 | 5/2012 | Sierawski | |
| 8,301,129 B2 | 10/2012 | Selph et al. | |
| 8,311,203 B2 | 11/2012 | Wang et al. | |
| 8,363,816 B2 | 1/2013 | Tsuei | |
| 8,644,805 B2 | 2/2014 | Earnshaw et al. | |
| 8,706,827 B1* | 4/2014 | Noble | G10L 13/027 709/206 |
| 8,798,249 B2 | 8/2014 | Kalpathy Narayanan | |
| 8,855,289 B2 | 10/2014 | Kaplan et al. | |
| 9,363,650 B2 | 6/2016 | Varadharajan | |
| 2004/0066928 A1 | 4/2004 | Leijonhufvud | |
| 2010/0158220 A1 | 6/2010 | Silverman | |
| 2010/0246785 A1 | 9/2010 | Wang et al. | |
| 2011/0021182 A1 | 1/2011 | Huan | |
| 2011/0076989 A1 | 3/2011 | Lynch | |
| 2011/0176670 A1 | 7/2011 | Kaplan et al. | |
| 2013/0324093 A1 | 12/2013 | Santamaria et al. | |
| 2015/0094042 A1* | 4/2015 | Kaplan | H04M 1/72566 455/414.1 |
| 2016/0028880 A1 | 1/2016 | Santamaria et al. | |
| 2016/0072937 A1 | 3/2016 | Gavney, Jr. | |
| 2016/0286045 A1* | 9/2016 | Shaltiel | H04M 3/48 |

FOREIGN PATENT DOCUMENTS

| | | |
|---|---|---|
| CN | 103152460 A | 6/2013 |
| CN | 104243699 A | 12/2014 |
| CN | 105323366 A | 2/2016 |
| EP | 1 694 039 A1 | 8/2006 |
| JP | 5317164 B2 | 10/2013 |
| KR | 10-2011-0081746 A | 7/2011 |
| KR | 101464951 B1 | 11/2014 |

\* cited by examiner

ELECTRONIC DEVICE AND METHOD FOR CALL BACK NOTIFICATION SERVICE

CROSS-REFERENCE TO RELATED APPLICATION(S)

This application claims the benefit under 35 U.S.C. § 119(a) of a Korean patent application filed on Aug. 30, 2016 in the Korean Intellectual Property Office and assigned Serial No. 10-2016-0111146, the entire disclosure of which is hereby incorporated by reference.

TECHNICAL FIELD

The present disclosure relates to an electronic device and method for a call back notification service in case of rejecting the reception of an incoming call.

BACKGROUND

An electronic device supports various communication services for connection with other electronic devices. A call rejection service, often referred to as a call screening service, is a service that allows a user to reject an incoming call when the user does not want to receive the call or is unable to receive the call. The call rejection service supports a function of sending a voice or text message for notifying the rejection of the incoming call to a caller device. This message may be referred to as a reception reject message.

The reception reject message sent to the caller device may include a user's intention of calling later. Nevertheless, the user may often forget a call back schedule. Therefore, the electronic device may support a reminder function to remind the user of the call back schedule.

However, a typical reminder function requires the user to separately register such a call back schedule through a special program (e.g., a reminder application or a to-do list application). Unfortunately, this may cause an inconvenience to the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method to automatically create a call back reminder and provide a notification of the call back reminder to a user when a reception reject message contains a call back intention of calling later.

In accordance with an aspect of the present disclosure, an electronic device is provided. The electronic device includes a communication interface, such as a transceiver, a display, a processor electrically connected to the communication interface and the display, and a memory electrically connected to the processor. The memory stores instructions for controlling, when executed, the processor to transmit a reception reject message to a caller device through the communication interface in response to an incoming call received from the caller device. Also, the processor is controlled to create a call back reminder linked to caller identification information of the caller device when the reception reject message contains context of a call back intention, and to output a notification of the created call back reminder.

In accordance with another aspect of the present disclosure, a call back notification service method of an electronic device is provided. The method includes transmitting a reception reject message to a caller device in response to an incoming call received from the caller device, creating a call back reminder linked to caller identification information of the caller device when the reception reject message contains context of a call back intention, and outputting a notification of the created call back reminder at a predetermined time.

In accordance with an aspect of the present disclosure, if any call back intention is contained in the context of a reception reject message sent or to be sent to a caller device, it is possible to automatically create a call back reminder and provide a notification of the created call back reminder at a predetermined reminder time. Also, this notification may be linked to a call function. It is therefore possible to provide convenience to remind the user of a call back schedule without requiring the user to separately register the reminder schedule.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments of the present disclosure will be described herein below with reference to the accompanying drawings. However, the embodiments of the present disclosure are not limited to the described embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the present disclosure are for the purpose of describing particular embodiments and are not intended to limit the present disclosure. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit," "logic," "logical block," "component," or "circuit." The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate array (FPGA), and a programmable-logic device for performing operations which have been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group (MPEG-1 or MPEG-2) audio layer3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a televisions (TV) box (e.g., Samsung Home- Sync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the present disclosure, the term "user" may indicate a person using an electronic device or a device (e.g., an artificial intelligence electronic device) using an electronic device.

Figure 1:
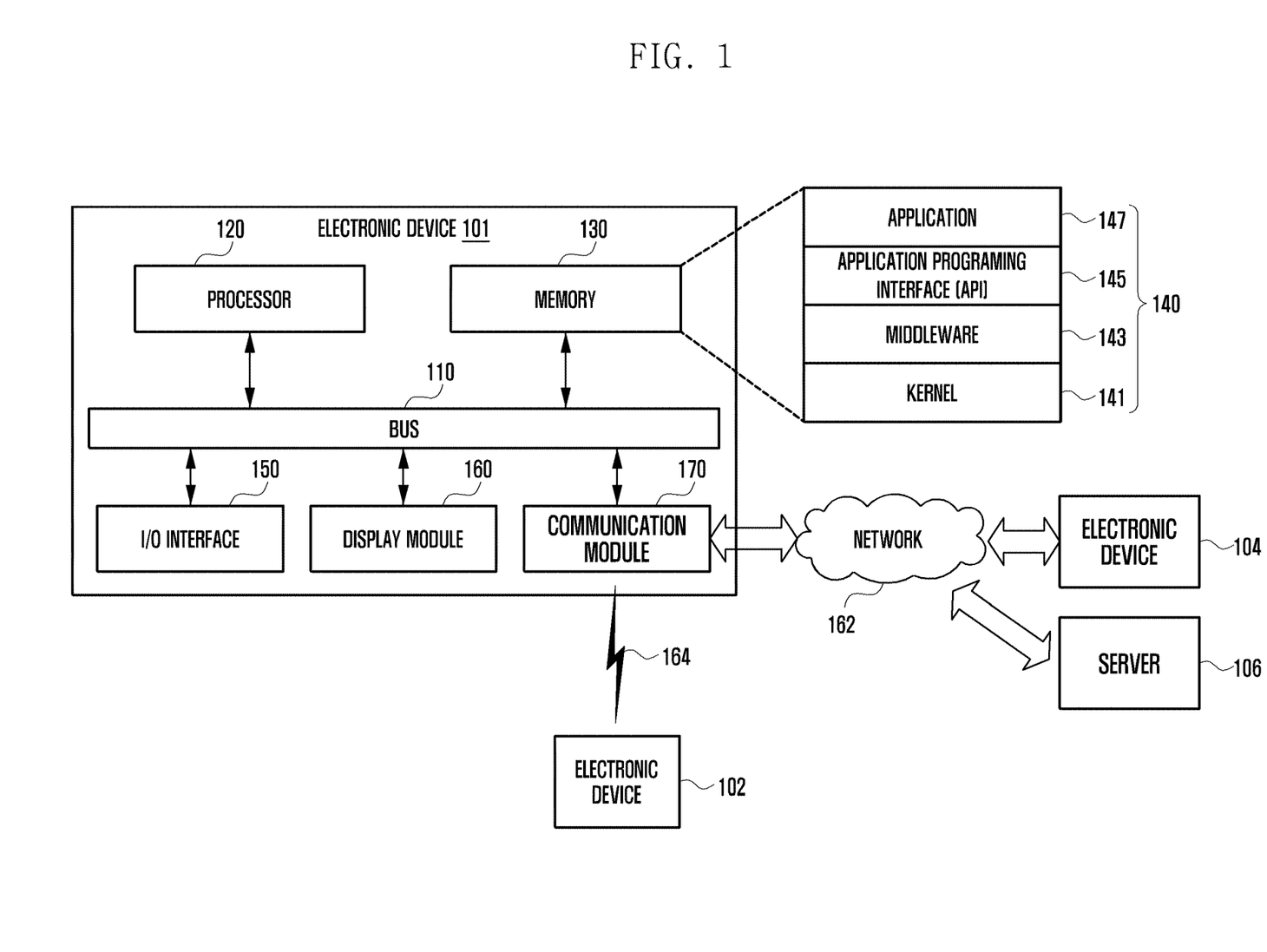
FIG. 1 is a block diagram illustrating an electronic device in a network environment according to various embodiments of the present disclosure.

FIG. 1 is a block diagram illustrating an electronic device in a network environment according to various embodiments of the present disclosure.

Referring to FIG. 1, the electronic device 101 includes a bus 110, a processor 120, a memory 130, an input/output (I/O) interface module 150, a display module 160, and a communication interface module (e.g., transceiver) 170.

The bus 110 may be a circuit connecting the above described components and transmitting communication (e.g., a control message) between the above described components. The processor 120 may receive commands from other components (e.g., the memory 130, the input/output interface module 150, the display module 160, or the communication interface module 170) through the bus 110, analyze the received commands, and execute calculation or data processing according to the analyzed commands.

The memory 130 may store commands or data received from the processor 120 or other components (e.g., the input/output interface module 150, the display module 160, or the communication interface module 170) or generated by the processor 120 or other components. The memory 130 may include programming modules 140, for example, a kernel 141, middleware 143, an application programming interface (API) 145, or an application 147. Each of the aforementioned programming modules may be implemented by software, firmware, hardware, or a combination of two or more thereof.

The kernel 141 may control or manage system resources (e.g., the bus 110, processor 120, memory 130, etc.) used to execute operations or functions of the programming modules, e.g., the middleware 143, the API 145, and the application 147. The kernel 141 may also provide an interface that may access and control/manage the components of the electronic device 101 via the middleware 143, the API 145, and the application 147.

The middleware 143 may make it possible for the API 145 or the application 147 to perform data communication with the kernel 141. The middleware 143 may also perform control operations (e.g., scheduling, load balancing, etc.) for task requests transmitted from the application 147 by methods, e.g., a method for assigning the order of priority to use the system resources (e.g., the bus 110, the processor 120, the memory 130, etc.) of the electronic device 101 to at least one of the applications 147.

The API 145 is the interface for the applications 147 to control the function provided by the kernel 141 or the middleware 143 and may include at least one interface or function (e.g. command) for file control, window control, image control, or text control.

The input/output (I/O) interface module 150 may receive a command or data as input from a user via an in-output apparatus (e.g., sensor, keyboard, touchscreen, or the like) and may deliver the received command or data to the processor 120 or the memory 130 through the bus 110. The I/O interface module 150 may display a video, an image, data, or the like to the user.

The display module 160 may be a liquid crystal display (LCD) and an active matrix organic light emitting diode (AM-OLED) display, micro electro mechanical systems (MEMS), electronic paper display, and the like. The display module 160 may include the touch panel and another module. The display module 160 may display the received various information (e.g., multi-media data, text data, etc.) from the above-described elements.

The communication interface module 170 may connect communication between the electronic device 101 and an electronic device 104 or a server 106. For example, the communication interface module 170 may access a network 162 through wireless or wired communication to communicate with the external device. The communication interface module 170 may also connect communication between the electronic device 101 and an electronic device 102. For example, the communication interface module 170 may access the external device 102 using wireless or wired communication 164. The wireless communication may include at least one of Wi-Fi, Bluetooth (BT), near field communication (NFC), a GPS, and cellular communication (e.g., long-term evolution (LTE), LTE-advanced (LTE-A), code division multiple access (CDMA), wideband CDMA (WCDMA), universal mobile telecommunications system (UMTS), wireless broadband (WiBro) or global system for mobile communications (GSM)). The wired communication may include at least one of, for example, a universal serial bus (USB), a high definition multimedia interface (HDMI), recommended standard 232 (RS-232), and a plain old telephone service (POTS).

The wireless communication may include global navigation satellite system (GNSS). The GNSS may include at least one of, for example, a GPS, a global navigation satellite system (Glonass), a navigation satellite system (Beidou), and a European global satellite-based navigation system (Galileo), according to a use area, a bandwidth, or the like.

Each of the first and second external electronic devices 102 and 104 may be the same or a different type of device as the electronic device 101. In various embodiments, all or part of the operations performed on the electronic device 101 may be performed on one or more other electronic devices. When the electronic device 101 has to perform a specific function or service automatically or upon request, instead of or in addition to directly executing the function or service, the electronic device 101 may request a different electronic device to perform an additional function associated with the function or service. The different electronic device may execute the requested or additional function and return the result to the electronic device 101, which may directly or additionally process the received result to provide the requested function or service. To this end, technologies such as cloud, distributed, and client-server computing may be utilized.

Figure 2:
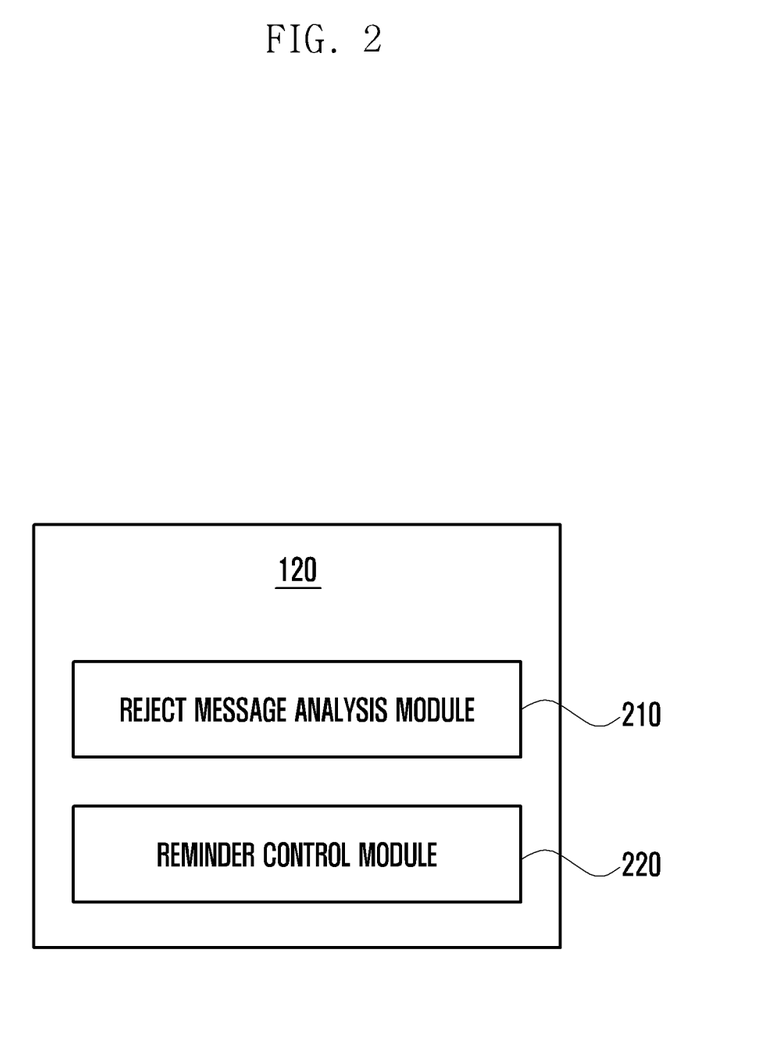
FIG. 2 is a block diagram illustrating a configuration of a processor according to various embodiments of the present disclosure.

FIG. 2 is a block diagram illustrating a configuration of a processor according to various embodiments of the present disclosure.

Referring to FIG. 2, the processor 120 (as also shown in FIG. 1) according to various embodiments may include a reject message analysis module 210 and a reminder control module 220.

When a reception reject message is transmitted to a caller device in response to an incoming call, the reject message analysis module 210 may determine whether there is a call back intention in the transmitted reception reject message. If there is any call back intention, the reject message analysis module 210 may generate a call back reminder creation signal and deliver it to the reminder control module 220.

According to an embodiment, the electronic device may store reception reject messages having predefined contents, and may support a function to set, as a reminder creation message, a certain reception reject message having a call back intention in the content thereof. Additionally or alternatively, the electronic device may support a function to preset and store a particular wording associated with a call back intention.

The reject message analysis module 210 may analyze context in a reception reject message sent to a caller device and thereby determine whether there is a wording associated with a call back intention. For example, if the reception reject message contains a particular wording such as "call back," "call . . . back," "call . . . later," "call . . . shortly," "call . . . after . . . minutes," "contact . . . later," "contact . . . next time," or the like, this wording may be determined as being associated with a call back intention.

When a reception reject message set as a reminder creation message is transmitted to a caller device, the reject message analysis module 210 may determine there is a call back intention. The reject message analysis module 210 may generate a call back reminder creation signal and deliver it to the reminder control module 220.

In response to the call back reminder creation signal, the reminder control module 220 may create and store a call back reminder, based on both identification information of a caller device corresponding to an incoming call and reminder notification time information. For example, the reminder control module 220 may automatically register caller identification information and call back information in a reminder program (or application) or a to-do list program (or application) and may also set a reminder notification time.

The reminder control module 220 may determine whether call back time information is contained in the transmitted reception reject message. If so, the reminder control module 220 may set a call back reminder notification time, based on the call back time information.

The reminder control module 220 may set a call back reminder notification time, based on schedule information. For example, the reminder control module 220 may identify a transmission time of the reception reject message and check whether a schedule overlapped with the identified transmission time is registered in the schedule program (or application). Further, the reminder control module 220 may identify an end time of the registered schedule. The reminder control module 220 may set a notification time of the call back reminder by considering the transmission time of the reception reject message and the end time of the registered schedule.

If the reception reject message fails to contain call back time information or if there is no schedule information having call back time information, the reminder control module 220 may set a call back reminder notification time, based on time information predefined as a default.

The reminder control module 220 may determine whether a given time set in the call back reminder elapses. If so, the reminder control module 220 may provide a notification of the call back reminder to the user. For example, the reminder control module 220 may output such a notification through an audio device, a vibration module, or a display.

If a call connection with the caller device fails or a call function is not executed after the notification of the call back reminder is outputted, the reminder control module 220 may reset a call back reminder notification time. Here, the reset time may be the default time set in the reminder program.

If the call back reminder is reset, the reminder control module 220 may identify the reset call back reminder notification time and retransmit a call back message to the caller device at the reset time. The above-discussed operations may be repeated.

Figure 3:
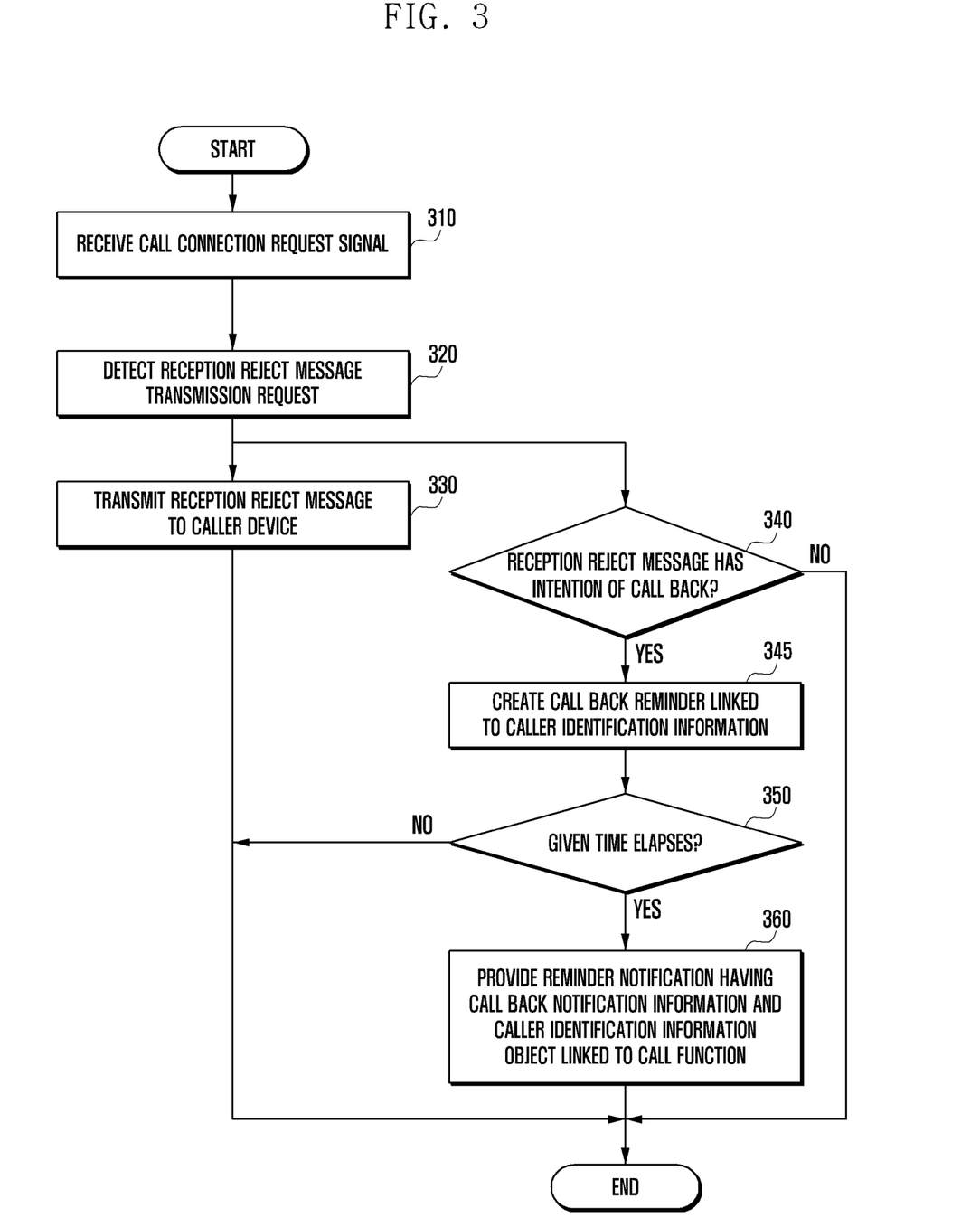
FIG. 3 is a flow diagram illustrating a call back notification service method according to various embodiments of the present disclosure.

FIG. 3 is a flow diagram illustrating a call back notification service method according to various embodiments of the present disclosure.

Referring to FIG. 3, a processor of an electronic device according to various embodiments may receive a call connection request signal at operation 310. For example, the electronic device, i.e., a recipient device, may receive an incoming call signal for requesting a call connection from the counterpart device, i.e., a caller device, through a communication interface (e.g., a wireless communication module). In this process, the processor may construct an incoming call reception screen (or user interface) in response to the incoming call signal and output the screen to a display.

At operation 320, the processor may detect a reception reject message transmission request in response to the incoming call signal. For example, the electronic device may control the display to output the incoming call reception screen in response to the incoming call signal, and detect a user input for requesting transmission of a reception reject message in response to an incoming call through a reception reject message menu or item outputted in the incoming call reception screen.

Figure 4:
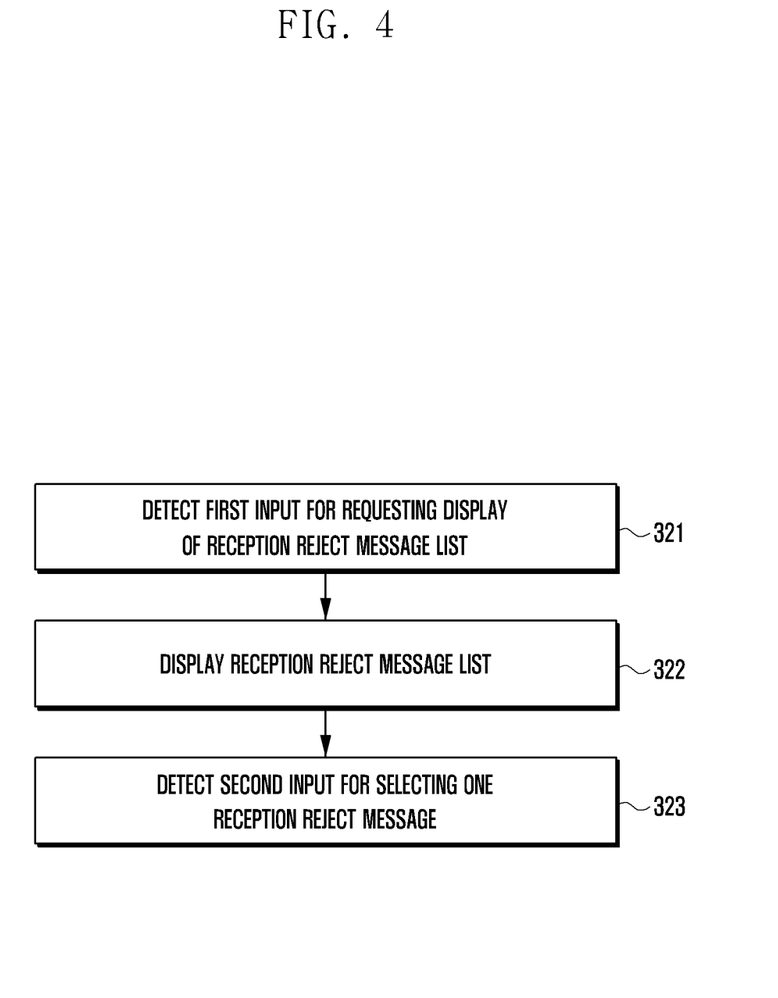
FIG. 4 is a flow diagram illustrating a call back notification service method according to various embodiments of the present disclosure.

Another example of detecting the reception reject message transmission request is shown in FIG. 4, which will be described later. According to another aspect of the present disclosure, the processor may additionally perform operations that are shown in FIG. 4 before detecting the reception reject message transmission request.

At operation 330, in response to the reception reject message transmission request, the processor may transmit the reception reject message to the caller device that requests the call connection.

For example, the reception reject message may include various types of reject messages such as "I can't talk now,"

"I can't answer the phone right now," "I'll call you back later," "I'll call you back shortly," "I'll call you back after 15 minutes," "I'm out of office," "I'm busy at the moment," and the like.

At operation 340, the processor may determine whether there is a call back intention in the context of the reception reject message transmitted or to be transmitted in response to the reception reject message transmission request. Operation 340 may be performed in parallel or sequentially with operation 330.

According to one embodiment, the electronic device may store reception reject messages having predefined contents, namely, store some default messages. Additionally or alternatively, the electronic device may support a function to allow a user to create a reception reject message with desired content and register it in a list of reception reject messages.

The processor may analyze context in the reception reject message sent to the caller device and thereby determine whether there is a wording associated with a call back intention. For example, if the reception reject message contains a particular wording such as "call back," "call . . . back," "call . . . later," "call . . . shortly," "call . . . after . . . minutes," "contact . . . later," "contact . . . next time," or the like, this wording may be determined as being associated with a call back intention. This wording associated with a call back intention may be defined or modified by the user.

At operation 345, if there is a wording associated with a call back intention in the reception reject message, the processor may create a call back reminder linked to caller identification information (e.g., a phone number or name of the caller device).

According to one embodiment, the processor may automatically register the caller identification information and call back information in a reminder program (or application) or a to-do list program (or application) and may also set a reminder notification time. Here, the reminder notification time may be set based on time information preset in the reminder program or contained in the reception reject message.

At operation 350, the processor may determine whether a given time (i.e., the set reminder notification time) elapses. If the given time elapses, the processor may provide a notification of the created call back reminder to the user at operation 360. For example, the electronic device may output the call back reminder notification through an audio device, a vibration module, or a display.

According to one embodiment, when the set time condition of the call back reminder is satisfied, the processor may trigger a vibration function to indicate that there is a reminder, and may output the call back reminder notification screen by controlling the display in response to a user's request for turning the screen on.

According to one embodiment, the call back reminder notification screen may include call back notification information and a caller identification information object. Here, the caller identification information object may be linked to a call function. When the user selects the caller identification information object, the processor may activate the call function (or application) and try a call connection with the caller device corresponding to the caller identification information.

Through the call back reminder notification, the user may recognize that there is an incoming call from the caller device, and may also recognize that the reception reject message has been transmitted to the caller device at the time of the incoming call.

Meanwhile, the processor may terminate the process if there is no wording associated with the call back intention in the reception reject message at operation 340 or if the time condition set at the generation of the call back reminder is not satisfied at operation 350.

FIG. 4 is a flow diagram illustrating a call back notification service method according to various embodiments of the present disclosure.

Referring to FIG. 4, an example of operation 320 as discussed above in FIG. 3 is illustrated.

At operation 321, the processor may detect a user's first input for requesting a display of a reception reject message list from the incoming call reception screen being displayed on the display in response to an incoming call signal. According to one embodiment, the incoming call reception screen may contain a reception response menu for the incoming call, a reception reject menu, and a reception reject message menu. The user may select the reception reject message menu from the incoming call reception screen.

At operation 322, the processor may output the list of reception reject messages to the display in response to the first input that selects the reception reject message menu. Here, the reception reject message list may contain at least one reception reject message, which is set as default in the electronic device, and/or at least one reception reject message which is registered in advance by the user.

At operation 323, the processor may detect a user's second input for selecting one reception reject message from the reception reject message list. In one example, the processor may control, in response to the second input, the communication interface to transmit the selected reception reject message to the caller device as discussed above at operation 330 in FIG. 3.

In another example, the processor may control, in response to the second input, the display to output a message edit screen on which the selected reception reject message is displayed. Thereafter, when a user's third input for selecting a transmission menu or item in the message edit screen is detected, the processor may control, in response to the third input, the communication interface to transmit the selected reception reject message to the caller device as discussed above at operation 330 in FIG. 3.

Figure 5:
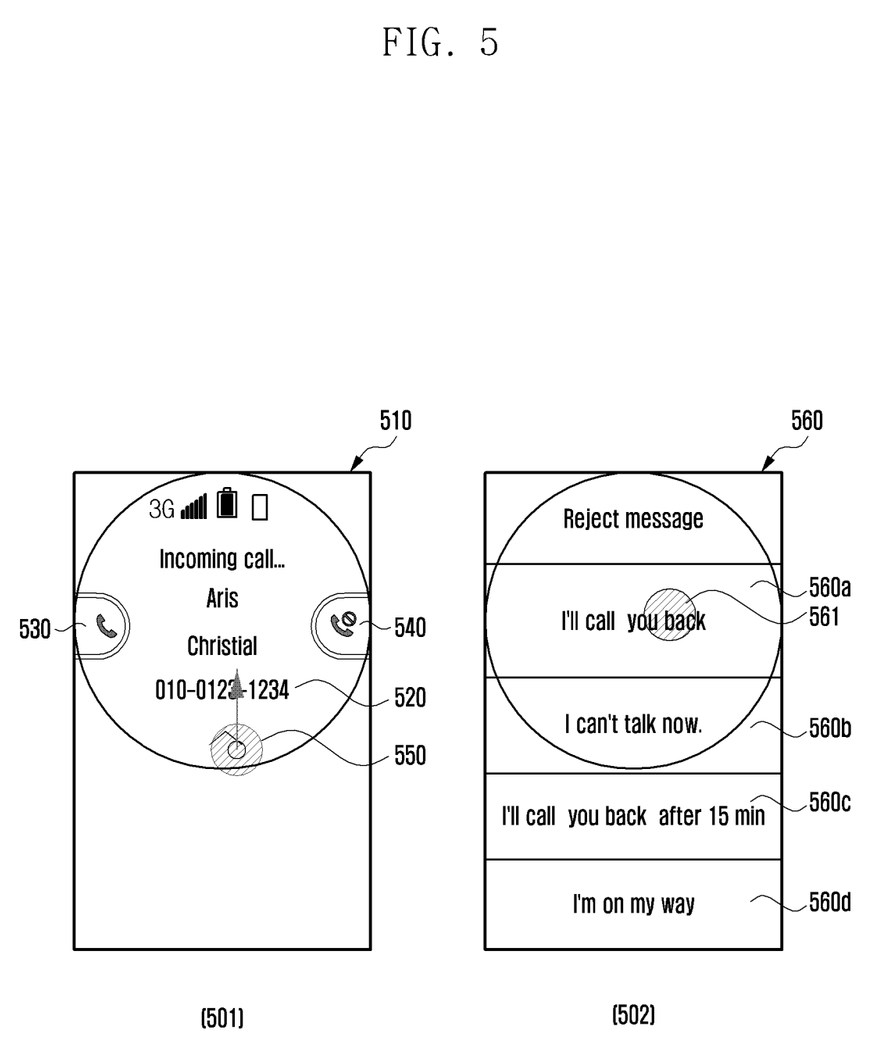
FIG. 5 is a diagram illustrating screens of transmitting a reception reject message according to various embodiments of the present disclosure.

FIG. 5 is a diagram illustrating screens of transmitting a reception reject message according to various embodiments of the present disclosure.

Referring to FIG. 5, the processor of the electronic device may output an incoming call reception screen 510 (or user interface) to the display of the electronic device when an incoming call signal is received. According to one embodiment, as shown in screenshot 501, the incoming call reception screen 510 may contain caller identification information 520 of a caller device that requests a call connection, a call item 530 for connecting the incoming call, a reject item 540 for rejecting the incoming call, and a reception reject message item 550 (or an item that invokes the reception reject message list). Here, the caller identification information 520 may provide a telephone number, name, image, and/or the like of the caller device.

Through the incoming call reception screen 510, the user may connect the incoming call, reject the incoming call, or select the reception reject message list to transmit a reception reject message.

For example, the user may perform an input for sending the reception reject message in response to the incoming call. For example, as shown in screenshot 501, the user may touch or drag upward the reception reject message item 550.

In response to this input, the processor may output a reception reject message list 560 as shown in screenshot 502. The reception reject message list 560 may contain one or more reception reject messages 560a, 560b, 560c, and 560d that specify the reason or content of rejection. Each reception reject message may be stored as default with predefined content in the electronic device and/or previously created and registered by the user.

The user may select one of the reception reject messages 560a, 560b, 560c, and 560d in the reception reject message list 560. For example, as shown, the user may input a touch 561 on a desired reception reject message 560a in the list 560.

The processor may recognize the selection of the specific reception reject message 560a and transmit the selected reception reject message 560a to the caller device.

In addition, the processor may analyze context in the reception reject message transmitted to the caller device to determine whether there is a call back intention. If so, the processor may create a call reminder.

Although not shown in the drawings, when the user selects one of the reception reject messages in the list 560, the processor may invoke a message edit screen on the display to allow the user to edit the content of the selected message. In this case, the caller identification information of the caller device may be inserted automatically in a corresponding field of the message edit screen. When the user selects a transmission menu or item contained in the message edit screen, the processor may transmit the reception reject message to the caller device.

Figure 6:
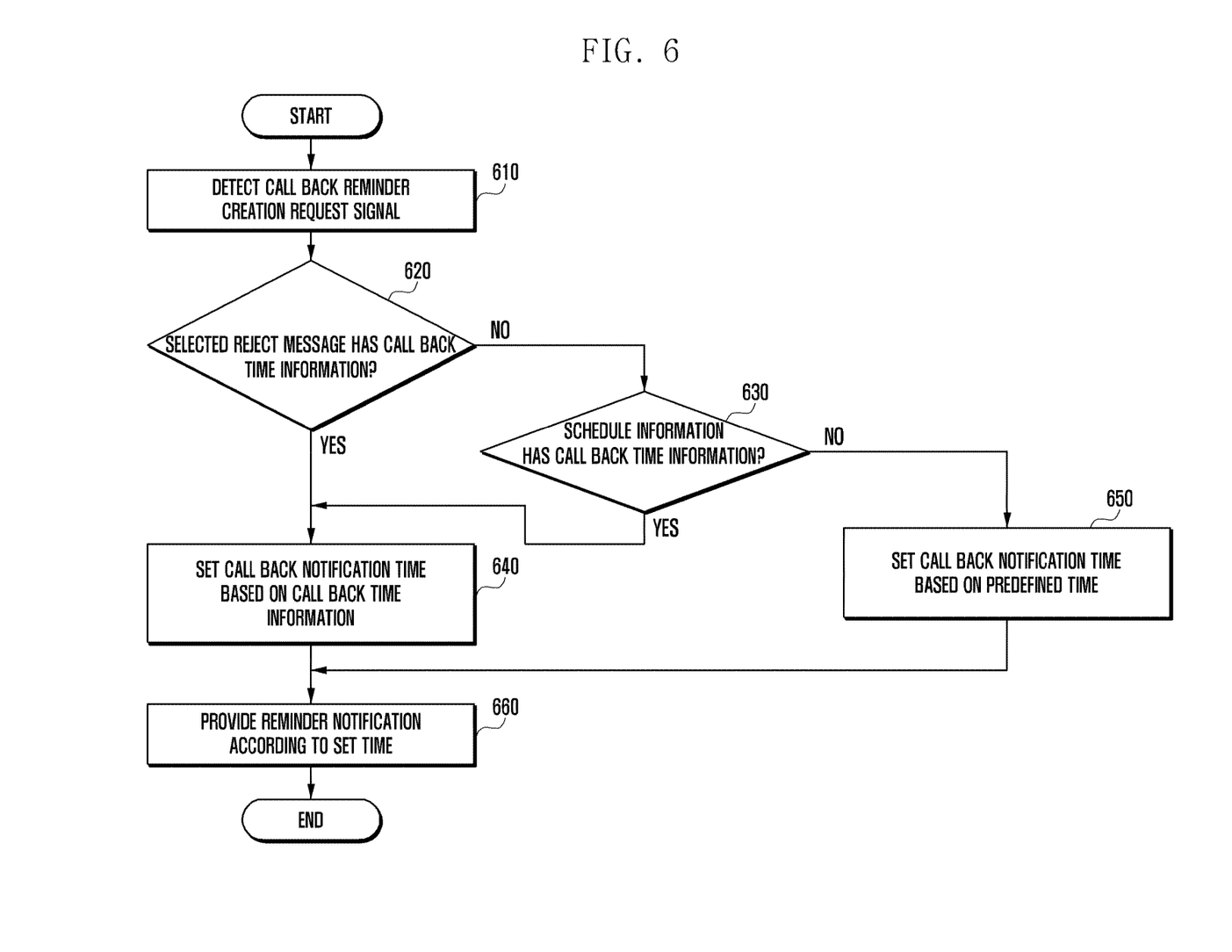
FIG. 6 is a flow diagram illustrating a method for setting a call back reminder time according to various embodiments of the present disclosure.

FIG. 6 is a flow diagram illustrating a method for setting a call back reminder time according to various embodiments of the present disclosure.

Referring to FIG. 6, the processor of the electronic device may detect a call back reminder creation request signal at operation 610. Here, the call back reminder creation request signal may be generated when it is determined that there is a call back intention in a reception reject message transmitted or to be transmitted to a caller device in response to an incoming call.

At operation 620, the processor may determine whether the reception reject message has call back time information. If so, the processor may set a call back reminder notification time at operation 640, based on the call back time information contained in the reception reject message. For example, if the reception reject message has content "I'll call you back after 15 min," the processor may recognize time information "15 minutes" from the reception reject message.

If it is determined at operation 620 that the reception reject message has no call back time information, the processor may determine at operation 630 whether there is schedule information having call back time information. If so, the processor may set a call back reminder notification time at operation 640, based on the call back time information contained in the schedule information.

According to one embodiment, the processor may identify a transmission time of the reception reject message and check whether a schedule overlapped with the identified transmission time is registered in the schedule program (or application). Further, the processor may identify an end time of the registered schedule. For example, if a schedule of a meeting between 3:00-4:00 PM, Jun. 25, 2016 is registered, and if an incoming call arrives at 3:10 PM, Jun. 25, 2016, the user may send a reception reject message to the caller device as soon as receiving the incoming call. In this case, the processor may check the meeting schedule and the transmission time of the reception reject message and set the call back reminder notification time to 50 minutes or 1 hour, for example, so that the call back reminder notification may be provided to the user at the end of the meeting schedule.

If it is determined at operation 630 that there is no schedule information having call back time information, the processor may set a call back reminder notification time at operation 650, based on a predefined time. For example, if one hour is preset as the notification time at the creation of the reminder, the processor may set the call back reminder notification time to one hour later.

At operation 660, the processor may provide a call back reminder notification to the user according to the set notification time. The call back reminder notification may be provided by means of vibration, sound, display, and/or the like.

Figure 7:
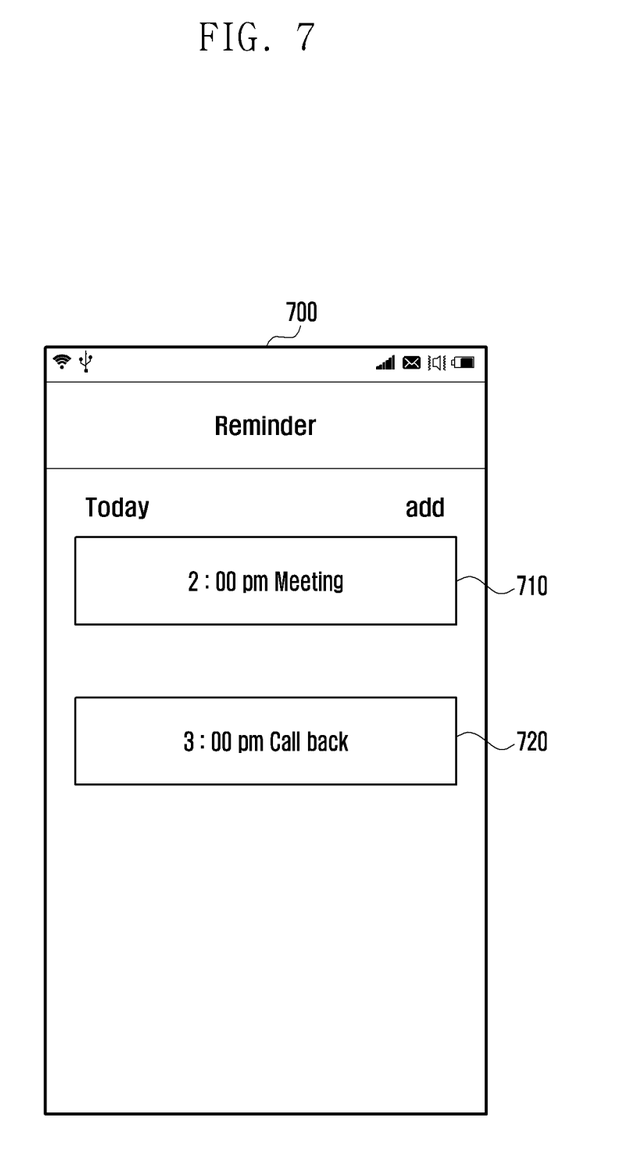
FIG. 7 is a diagram illustrating a reminder list screen according to various embodiments of the present disclosure.

FIG. 7 is a diagram illustrating a reminder list screen according to various embodiments of the present disclosure.

Referring to FIG. 7, the electronic device may support a reminder program (or application) or a to-do list program (or application), and may automatically register a created call back reminder in such a program or application.

For example, the electronic device may display a reminder application screen 700 on the display in response to a request for the execution of a reminder application. The reminder application screen 700 may contain one or more reminder items 710 and 720. The reminder item may be, for example, a user-created item 710 having the reminder content and time which are set previously by the user. Also, the reminder item may be an auto-created item 720 which is automatically created when the reception reject message contains a call back intention.

Figure 8:
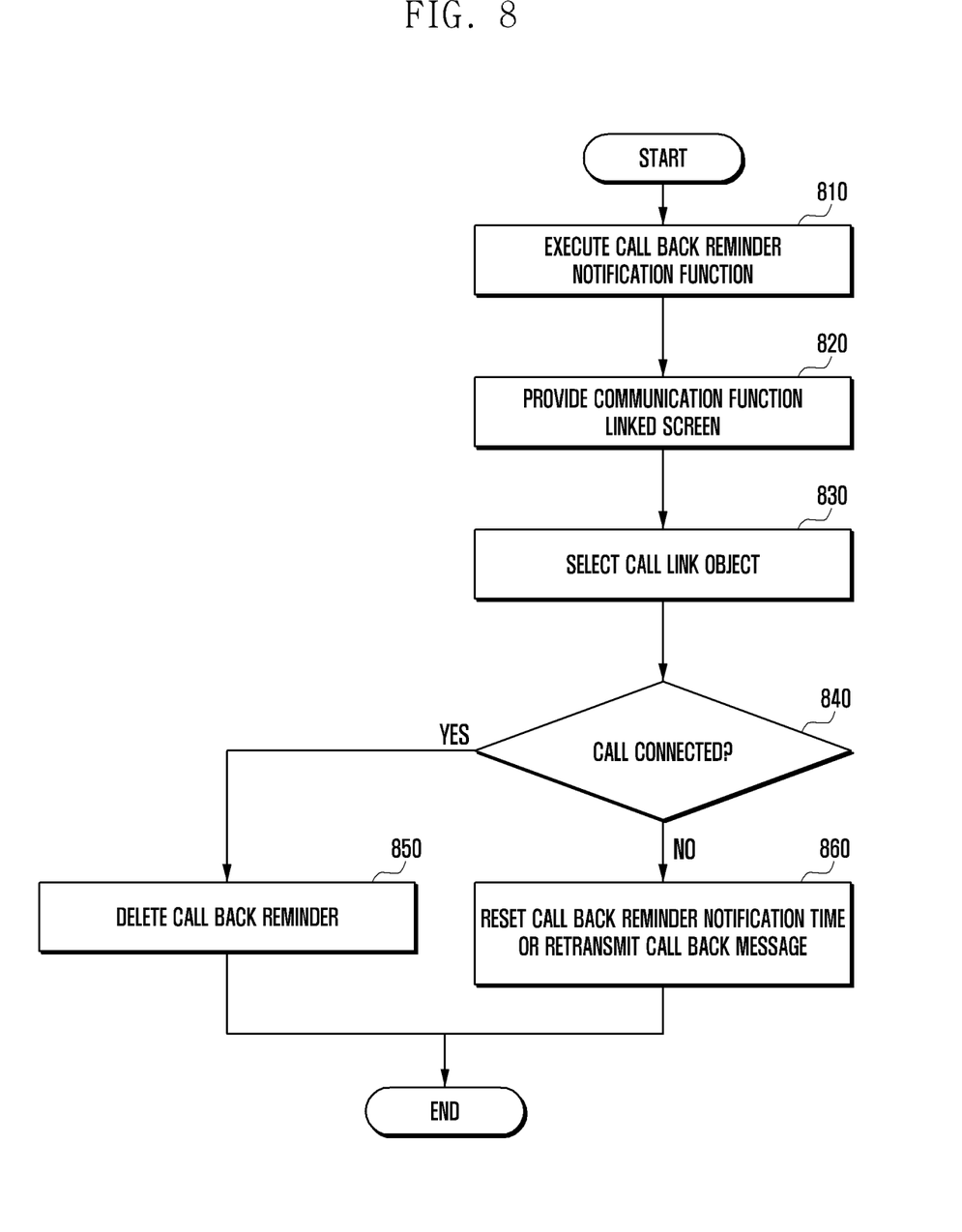
FIG. 8 is a flow diagram illustrating a call back notification service method according to various embodiments of the present disclosure.

FIG. 8 is a flow diagram illustrating a call back notification service method according to various embodiments of the present disclosure.

Referring to FIG. 8, the processor of the electronic device may provide a call back reminder notification screen to the display in response to the execution of a call back reminder notification function at a set notification time at operation 810. The call back reminder notification screen may contain a caller identification information object of a caller device that sends an incoming call, and a communication function invoke object (or item, menu, button, icon, etc.). Here, the caller identification information of the caller device may include a telephone number, name, image, and/or the like of the caller device. The caller identification information object may be an object linked to a call function corresponding to the caller identification information.

At operation 820, the processor may provide a communication function linked screen (e.g., a screen linked to a call or message function) to the display in response to a user input for selecting the communication function invoke object. For example, the communication function linked screen may contain the caller identification information corresponding to the rejected incoming call, a call function object for invoking the call function, and/or a message function object for invoking the message function.

At operation 830, the processor may detect a selection of a call link object for a call connection to the caller device, and transmit a call connection request to the caller device in response to the selection of the call link object. Here, the call link object for the call connection may be the caller identification information object provided to the call back reminder notification screen, or the call function object provided to the communication function linked screen.

At operation 840, the processor may determine whether the call connection with the caller device is performed. At operation 850, the processor may perform the call connection in response to a reply signal of the caller device. If so, the processor may automatically delete the registered call back reminder from the reminder program or the to-do list.

If the call connection with the caller device fails, or if the call function is not executed, the processor may reset a call back reminder notification time at operation 860. Here, the reset time may be the default time set in the reminder program.

Additionally, the processor may retransmit a call back message to the caller device at the reset time. The above-discussed operations 810 to 860 may be repeated.

Figure 9:
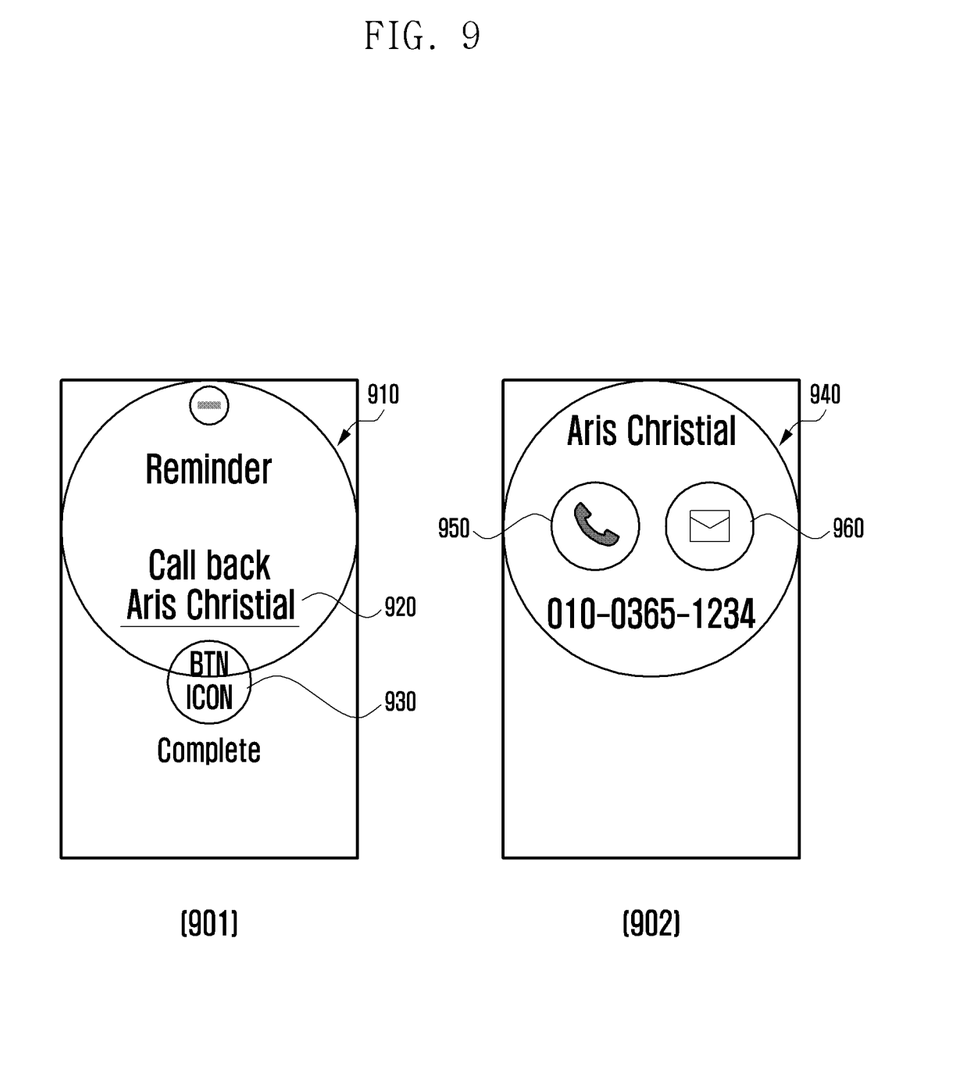
FIG. 9 is a diagram illustrating a call back notification screen according to various embodiments of the present disclosure.

FIG. 9 is a diagram illustrating a call back notification screen according to various embodiments of the present disclosure.

Referring to FIG. 9, screenshot 901 illustrates that the processor of the electronic device may display a call back reminder notification screen 910 on the display as also discussed at operation 810 in FIG. 8. The call back reminder notification screen 910 may contain, but is not limited to, a caller identification information object 920 of a caller device that sends an incoming call, and a communication function invoke object 930 (or item, menu, button, icon, etc.). Here, the caller identification information object 920 may be linked to a call function.

According to one embodiment, if the user selects the caller identification information object 920 in the call back reminder notification screen 910, the processor may transmit a call connection signal to the caller device corresponding to the selected caller identification information object and display a call connection screen (not shown) on the display.

According to another embodiment, when the user selects the communication function invoke object 930 in the call back reminder notification screen 910, the processor may provide a communication function linked screen 940 in response to the user's selection as shown in screenshot 902. For example, the communication function linked screen 940 may contain the caller identification information corresponding to the rejected incoming call, a call function object 950 for invoking the call function, and/or a message function object 960 for invoking the message function.

If the user selects the call function object 950 in the communication function linked screen 940, the processor may try a call connection with the caller device. Also, when the user selects the message function object 960, the processor may invoke a message edit screen (not shown) on the display. In this case, the caller identification information of the caller device may be inserted automatically in a corresponding field of the message edit screen.

Therefore, through the call back reminder notification, the user may not only recognize the fact of having rejected an incoming call, but also easily perform a call connection with or message transmission to the caller device without inconvenience of entering an input for executing a call function or a message function, entering a phone number, or the like.

Although the above-discussed various embodiments of the present disclosure focus on a call back reminder to allow a user to easily perform a call function, this is only and not to be construed as a limitation of the present disclosure. Additionally or alternatively, the above-discussed reminder notification may be created and provided in connection with any other function associated with a caller device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a transceiver;
a display configured to, based on an incoming call signal being received from a caller device, display an incoming call reception screen that includes a call icon for connecting an incoming call, a reject icon for rejecting the incoming call, and a reception reject message icon;
a processor electrically connected to the transceiver and the display; and
a memory electrically connected to the processor,
wherein the memory stores instructions for controlling, when executed, the processor to:
in response to selecting the reception reject message icon while displaying the incoming call reception screen, control the display to display a reception reject message list that includes one or more reception rejection messages which, if selected, is transmitted to the caller device,
in response to selecting a reception reject message from the displayed one or more reception reject messages, control the transceiver to transmit the selected reception reject message to the caller device through the transceiver,
based on a determination that the reception reject message includes a call back text, create a call back reminder linked to caller identification information of the caller device,
based on a determination that the reception reject message does not include the call back text, terminating the creating of the call back reminder linked to caller identification information of the caller device, and
in response to creating the call back reminder, control to output a notification of the call back reminder at a predetermined time associated with the call back reminder.

2. The electronic device of claim 1, wherein the memory stores further instructions for controlling, when executed, the processor to output the call back reminder notification including a call function linked object corresponding to the caller device at the predetermined time of the call back reminder.

3. The electronic device of claim 1, wherein the memory stores further instructions for controlling, when executed, the processor to:
in response to the incoming call, control to output the incoming call reception screen to the display,
in response to a first input for requesting a display of the reception reject message list being detected from the incoming call reception screen, control to output the reception reject message list containing the one or more reception reject messages to the display, and
in response to a second input for selecting one of the reception reject messages contained in the reception reject message list, control the transceiver to transmit the reception reject message selected by the second input to the caller device.

4. The electronic device of claim 3, wherein the memory stores further instructions for controlling, when executed, the processor to, based on the reception reject message selected by the second input containing a context of a call back intention, create the call back reminder.

5. The electronic device of claim 1, wherein the memory stores further instructions for controlling, when executed, the processor to register the created call back reminder in a reminder program or a to-do list program.

6. The electronic device of claim 1, wherein the memory stores further instructions for controlling, when executed, the processor to set a notification time of the call back reminder, based on time information contained in the reception reject message.

7. The electronic device of claim 1, wherein the memory stores further instructions for controlling, when executed, the processor to:
- identify a transmission time of the reception reject message,
- identify an end time of a schedule registered in the memory and overlapped with the identified transmission time, and
- set a notification time of the call back reminder by considering the transmission time of the reception reject message and the end time of the registered schedule.

8. The electronic device of claim 1, wherein the memory stores further instructions for controlling, when executed, the processor to, when a predetermined notification time elapses, control to output the notification of the created call back reminder through a speaker or a vibration module.

9. The electronic device of claim 1,
- wherein the memory stores further instructions for controlling, when executed, the processor to:
  - construct a call back reminder notification screen associated with the created call back reminder, and
  - control to output the call back reminder notification screen to the display at a predetermined notification time,
- wherein the call back reminder notification screen contains at least one of a caller identification information object linked to a call function or a communication function invoke object, and
- wherein the communication function invoke object comprises a message function object for invoking a message function.

10. The electronic device of claim 9, wherein the memory stores further instructions for controlling, when executed, the processor to:
- in response to an input for selecting the message function object, transmit a message, and
- in response to an input for selecting the caller identification information object, control the transceiver to transmit a call connection request to the caller device.

11. The electronic device of claim 1, wherein the memory stores further instructions for controlling, when executed, the processor to:
- based on a call connection with the caller device failing or based on a call function not being executed, reset a call back reminder notification time, and
- control to output the notification of the call back reminder at the reset call back reminder notification time.

12. A call back notification service method of an electronic device, the method comprising:
- based on an incoming call signal being received from a caller device, displaying an incoming call reception screen that includes a call icon for connecting an incoming call, a reject icon for rejecting the incoming call, and a reception reject message icon;
- in response to selecting the reception reject message icon while displaying the incoming call reception screen, displaying a reception reject message list that includes one or more reception reject messages which, if selected, is transmitted to the caller device;
- in response to selecting a reception reject message from the displayed one or more reception reject messages, transmitting, by a processor of the electronic device via a transceiver of the electronic device, the selected reception reject message to the caller device;
- based on a determination that the reception reject message includes a call back text, creating, by the processor, a call back reminder linked to caller identification information of the caller device;
- based on a determination that the reception reject message does not include the call back text, terminating the creating of the call back reminder linked to caller identification information of the caller device; and
- in response to creating the call back reminder, outputting, by the processor, a notification of the call back reminder at a predetermined time associated with the call back reminder.

13. The method of claim 12, wherein the creating of the call back reminder includes:
- determining whether the reception reject message contains a context of a call back intention; and
- based on the reception reject message containing the context of the call back intention, creating, by the processor, the call back reminder.

14. The method of claim 12, wherein the creating of the call back reminder includes registering, by the processor, the created call back reminder in a reminder program or a to-do list program.

15. The method of claim 12, wherein the creating of the call back reminder includes:
- based on the reception reject message containing time information, setting, by the processor, a notification time of the call back reminder based on the time information; and
- based on the reception reject message containing no time information, setting, by the processor, the notification time of the call back reminder as a default time.

16. The method of claim 12, wherein the creating of the call back reminder includes:
- identifying, by the processor, a transmission time of the reception reject message;
- identifying, by the processor, an end time of a schedule registered in a memory and overlapped with the identified transmission time; and
- setting, by the processor, a notification time of the call back reminder by considering the transmission time of the reception reject message and the end time of the registered schedule.

17. The method of claim 12,
- wherein the outputting of the notification of the call back reminder includes:
  - displaying, by the processor, a call back reminder notification screen on a display of the electronic device; and
  - outputting, by the processor, a sound or a vibration to indicate that there is the call back reminder, and
- wherein the call back reminder notification screen contains at least one of a caller identification information object linked to a call function or a message function object for invoking a message function.

18. The method of claim 12, further comprising, after the outputting of the notification of the call back reminder:
- based on a call connection with the caller device failing or based on a call function not being executed, resetting, by the processor, a call back reminder notification time; and
- outputting, by the processor, the notification of the call back reminder at the reset call back reminder notification time.

19. The method of claim 12, wherein the transmitting of the reception reject message to the caller device includes:
- in response to receiving the incoming call, outputting, by the processor, the incoming call reception screen to a display of the electronic device;
- in response to a first input for requesting a display of the reception reject message list detected from the incoming call reception screen, outputting, by the processor, the reception reject message list containing the one or more reception reject messages to the display; and
- in response to a second input for selecting one of the reception reject messages contained in the reception reject message list, transmitting, by the processor via the transceiver, the reception reject message selected by the second input to the caller device.

20. A method of rejecting an incoming call by an electronic device, the method comprising:
- based on an incoming call signal being received from a caller device, displaying, on a display of the electronic device, an incoming call reception screen that includes a call icon for connecting the incoming call, a reject icon for rejecting the incoming call, and a reception reject message icon;
- in response to a first user input selecting the reception reject message icon while the display displays the incoming call reception screen, displaying, on the display, a reception reject message list that includes one or more reception reject messages which, if selected, is transmitted to the caller device;
- in response to a second user input selecting a reception reject message from the displayed one or more reception reject messages, transmitting, by a processor of the electronic device via a transceiver of the electronic device, the selected reception reject message to the caller device;
- based on a determination that the reception reject message comprises a call back text, creating, by the processor, a call back reminder linked to caller identification information of the caller device; and
- based on a determination that the reception reject message does not comprise the call back text, terminating the creating of the call back reminder linked to caller identification information of the caller device.

21. The method of claim 17, further comprising, after the displaying of the call back reminder notification screen:
- in response to receiving an input for selecting the message function object, transmitting a message; and
- in response to receiving an input for selecting the caller identification information object, transmitting a call connection request to the caller device.

\* \* \* \* \*